Aug. 23, 1960
D. D. PEEBLES
2,950,204
DRIED EGG PRODUCT AND PROCESS OF MANUFACTURE
Filed March 5, 1956
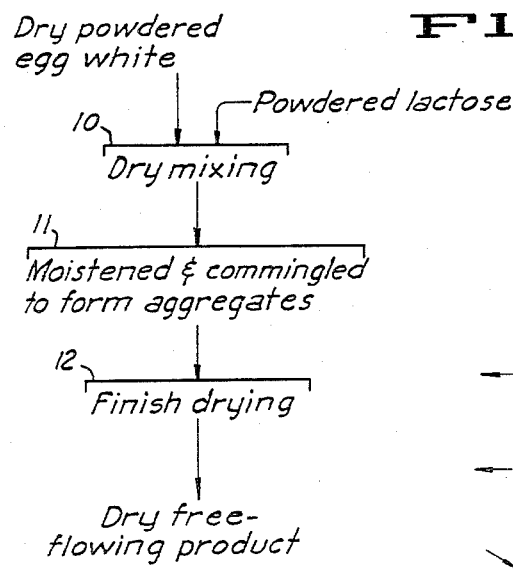
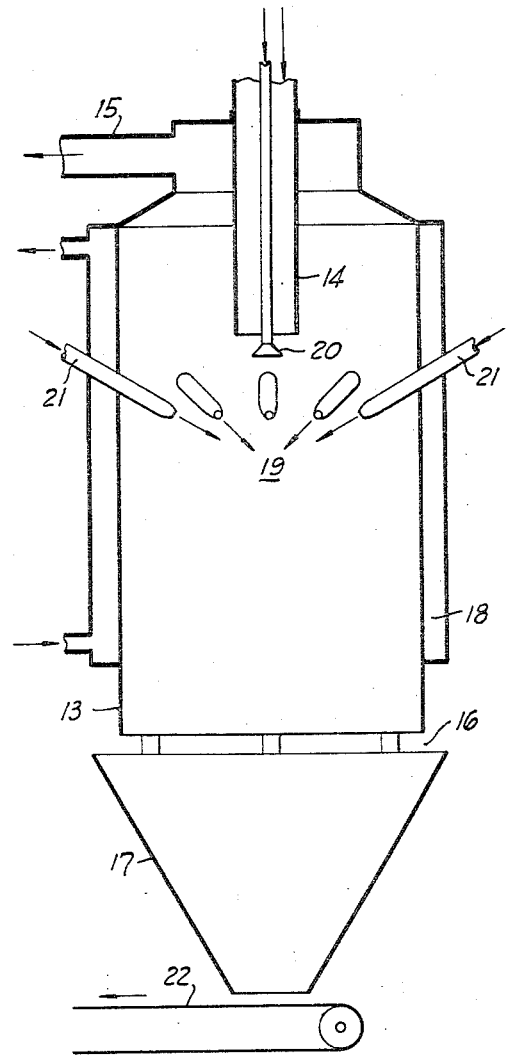
INVENTOR
David D. Peebles
BY
ATTORNEYS

United States Patent Office 2,950,204
Patented Aug. 23, 1960

2,950,204

DRIED EGG PRODUCT AND PROCESS OF MANUFACTURE

David D. Peebles, Davis, Calif., assignor, by mesne assignments, to Foremost Dairies, Inc., San Francisco, Calif., a corporation of New York Filed Mar. 5, 1956, Ser. No. 569,361

5 Claims. (Cl. 99—210)

This invention relates generally to dried egg products such as are suitable for use in cake mixes and the like, and to processes for their manufacture.

It has been common to directly spray dry raw egg white to provide a preserved product in powdered form. The particle fineness of such a product is such that the bulk of the material passes through a 100 mesh screen. Such powder does not flow readily and cannot be packaged in a carton provided with a pouring spout. In this respect its characteristics are similar to dry powdered cornstarch.

In general it is an object of the present invention to provide a novel process which produces a dry divided egg product having good free-flowing characteristics.

Another object of the invention is to provide a process of the above character which can be applied to egg white without detrimentally affecting the desirable properties of this material, particularly the properties desired in cake mixes.

Another object of the invention is to provide a process of the above character which can be applied to conventional dried egg white powder without undue expense.

Another object of the invention is to provide a novel dried egg white product having good free-flowing characteristics.

Additional objects and features of the invention will appear from the following description in which the preferred embodiment has been set forth in detail in conjunction with the accompanying drawing.

Referring to the drawing:

Figure 1 is a simple flow sheet outlining one way in which the process can be carried out.

Figure 2 is a side elevational view in section illustrating equipment which can be used for the moistening and agglomerating operation.

In general the present process employs a good quality edible egg white powder, such as is commonly produced by a spray drying. This powder is treated by passing it through a zone in which the particles are moistened to make them sticky and commingled to cause random adherence between the sticky particles. As a result moist porous random aggregates are formed, which are subjected to final drying to produce the final product. The moistening and aggregating operations are carried out under controlled moisture and temperature conditions.

In the flow sheet of Figure 1, I have shown dried powdered egg white, such as is produced by a spray drying operation, being supplied to a mixing operation 10 where it is dry mixed with a quantity of powdered lactose. The amount of lactose added can vary from about 25 to 50% of the total mix. It is preferable for a minor part of the lactose powder to be in the crystalline form, that is in the form of alpha monohydrate. The remainder of the lactose is in the anhydrous or amorphous form. With respect to the total amount of lactose powder employed, from 5 to 25% may be crystalline. Both the egg white and the powdered lactose may have a particle size such that the bulk of the material readily passes through a 100 mesh screen. The moisture content (total) of the spray dried egg white in a typical instance is of the order of 8%, and the moisture content (total) of the lactose powder, including both the crystalline and amorphous, can be of the order of 4%.

The dry mix from operation 10 is supplied to operation 11 in which the particles are moistened to make them sticky, and caused to contact and adhere together in random fashion to form moist porous random aggregates. As will be presently described the equipment shown in Figure 2 is suitable for this operation. The amount of moisture added is preferably such that the moist aggregates leaving this operation have a moisture content (total) of the order of from 15 to 20%, about 16 to 17% being considered optimum. The average treatment temperature in this operation should be controlled with considerable care, and should be of the order of from about 80 to 100° F., about 100° F. being deemed optimum.

Following operation 11 the moist aggregates are fed to the finish drying operation 12, where excess moisture is removed to provide a final moisture content of the order of 5% (total). In the final drying operation care should be taken to avoid use of excessive temperatures in the preliminary stage of drying. For example the first phase of drying can be carried out by contact with drying air at an inlet temperature of the order of 225° F., to reduce the moisture content to a value of the order of about 8%. Thereafter the air temperature (inlet) can be elevated to a level of the order of from 250 to 270° F., for more rapid and efficient drying.

The equipment of Figure 2 consists of a vertical chamber 13 having a downwardly extending inlet conduit 14 for introducing the powdered material as conveyed pneumatically from a convenient supply hopper. Some air is removed through conduit 15 whereby some atmospheric air is drawn into the chamber through the lower opening 16 between the main part of the chamber and the discharge hopper 17. The sides of the chamber can be kept warm by circulating warm air through the jacket 18, thereby preventing the condensing of moisture on the inner chamber surfaces.

The powder introduced into the upper portion of the chamber passes through zone 19 where it is commingled with finely atomized water discharged from nozzle 20. Also some saturated steam is introduced by way of nozzles 21. The falling powder acquires moisture whereby the material discharged on the lower conveyer 22 has a moisture content ranging from about 15 to 20%, as previously mentioned. The ratio between water and saturated steam is controlled to produce the desired average treatment temperature within the treatment zone 19.

As the particles of powdered material are commingled with the vapor and atomized water in zone 19, moisture distributes itself on the surfaces of the particles, whereby the particles acquire a distinct surface stickiness. Sufficient commingling takes place within the treatment zone whereby the particles are brought into direct contact, with the result that the particles adhere together in the form of porous random aggregates.

The time period of treatment in the equipment of Figure 2 may range from about 10 to 60 seconds. The aggregates discharged from the lower end of the equipment are relatively soft and porous, and initially will not withstand either mechanical handling, or drying temperatures above about 225° F. In general this material has a puffed or fluffy appearance.

It is desirable to permit the moist aggregates to rest without handling before finish drying. Thus they are shown being deposited in an uncompacted mass on the endless belt conveyor 22, which serves to convey the material to the finish drier. The holding time or period of rest may range from 30 to 90 seconds, and is controlled by the length of the conveyor 22, and its speed of operation. During this holding period there is a lowering of the temperature level of the material and the aggregates become firmer and less sticky. That part of the lactose originally in the anhydrous form is caused to be hydrated and crystallized by the end of the holding period, which probably accounts for the change to a firmer and less sticky form.

The drying equipment employed should be such that it does not cause any undue grinding or crushing of the aggregates. Suitable equipment for this purpose employs a screen provided with small perforations, which is vibrated to cause the material to progress from the feed to the discharge end of the same, and to apply vertical motion to maintain the powder as a loose working layer. In conjunction with the vibrating action, warm drying air is delivered upwardly through the screen to pass upwardly through the layer of powder. The number and size of the openings in the screen is so chosen in relation to the rate of air delivery therethrough that the product moving along the screen is fluffed or levitated to form a layer several times the thickness it would normally have if at rest. By this technique the product is caused to progress along the screen and is at least partially supported by the cushion of air intermingled therewith. This provides drying action without rough or mechanical handling which might break up the powder aggregates.

The initial phase of finish drying is controlled as to temperature to avoid any detrimental effect upon the aggregates. In this connection it has been observed that if the inlet air temperature to the drier during the initial drying phase is substantially above about 225° F., the dried aggregates tend to be relatively weak and readily crumble or crush. For the reasons just mentioned, I start the first phase of the finish drying with an inlet air temperature that may range from 180° to 225° F., and after the moisture content has been reduced to a value of the order of about 8% (total) the drying temperature is increased to from 250 to 270° F., for more rapid and efficient drying.

The product produced by my process is granular in form, and possesses excellent free-flowing characteristics. It is relatively nonhygroscopic and can be exposed to the atmosphere without caking. The individual granules are in the form of porous aggregates. These aggregates have sufficient mechanical strength to permit packaging in cartons and marketing without undue development of fines. The desirable properties of the egg white, having particular reference to its use in cake mixes, is not detrimentally effected. Substantially all of the lactose content is crystallized in the form of alpha monohydrate. Assuming use of the product in cake mixes, it can be intermixed and packaged with other ingredients, such as granulated cane sugar. The particle size of the final product is such that the bulk of the material remains on a 100 mesh screen, and will pass through a 20 mesh screen.

As a specific example, in one instance the process was carried out as follows: Raw egg white was spray dried to form a good edible dry powdered product. This powdered egg white was then mixed with an equal quantity (by weight) of lactose powder. One half of this powder was in the anhydrous or amorphous form, and the other half in the form of crystallized alpha monohydrate. The dry mix from operation 10 was supplied continuously to the apparatus of Figure 2, and the introduction of atomized water and saturated steam controlled to produce an average temperature in zone 19 of about 100° F., and to provide aggregates discharging from the equipment with a moisture content of about 17% (total). The discharging material was deposited upon the endless belt conveyor 22, which transferred the material to the finish drier. The holding period during transit was about 45 seconds, during which time the material became definitely less sticky and more firm. Material discharged by the conveyor 22 was free-flowing in character, and was delivered to the first stage of a drier constructed in the manner previously described. Drying air was supplied to the first drier stage at a temperature of 225° F., and the drying continued in this stage to reduce the moisture content to about 8% (total). Thereafter the material was dried in similar equipment with the inlet temperature at a value of about 250° F., and such drying was continued to produce a final moisture content of 5% (total). The product produced in accordance with this example had the desirable characteristics previously described.

Previous mention has been made to carefully controlling the moisture applied to the material in the apparatus of Figure 2, and also to carefully controlling the treatment temperature. If an insufficient amount of moisture is imparted to the particles, or if the temperature is too low, the material does not properly aggregate, and such aggregates as may be formed are relatively weak, and do not withstand handling during finish drying. As a result the final product will consist largely of finely divided powder. In the event the amount of moisture is too great, or the treatment temperature is too high, the material tends to coalesce together instead of forming well defined porous aggregates. Under such conditions material tends to adhere to the side walls of the chamber 13, and also any discharging material tends to coalesce into a composite mass, whereby the material at the discharge end of the conveyor 22 is not free-flowing.

Instead of supplying all of the lactose powder to the dry mixing operation, a part of the anhydrous lactose can be blended with the raw egg white before spray drying, in which event it is present in anhydrous form in the egg white powder.

I claim:

1. In a process for the manufacture of a free-flowing dry egg white product having enhanced wettability, the steps of continuously supplying a dry powdered egg white to a treatment zone, causing the particles of dry powdered egg white to progress through said zone in dispersed condition, continuously supplying moisture to said zone whereby the particles are caused to take up moisture while in dispersed condition and contact together to form moist random aggregates, the temperature within said zone being of the order of about 80 to 100° F. and the amount of moisture added to the particles being such that the resulting moist, porous aggregates contain from 15 to 20% moisture, removing the moist porous aggregates from said zone, and then removing a major portion of such moisture from the same while leaving the aggregates substantially intact to produce a final dry product in the form of porous free flowing aggregates.

2. In a process for the manufacture of a free-flowing dry egg white product, the steps of continuously supplying a mixture of dry powdered egg white and powdered lactose to a treatment zone in the proportions of about 75 to 50% egg white to about 25 to 50% lactose, causing the particles of the mix to progress through said zone in dispersed condition, continuously supplying moisture to said zone whereby the particles are caused to take up moisture while in dispersed condition and contact together to form moist random aggregates, the temperature within said zone being of the order of about 80 to 100° F. and the amount of moisture added to the particles being such that the resulting moist porous aggregates contain from 15 to 20% moisture, removing the moist porous aggregates from said zone, and then removing a major portion of such moisture from the same while leaving the aggregates substantially intact, to produce a final dry product in the form of porous free flowing aggregates.

3. In a process for the manufacture of a free-flowing dry egg white product, the steps of forming a mixture of dry powdered egg white and lactose in the proportions of about 75 to 50% egg white to 25 to 50% lactose, a part of the lactose being anhydrous and another part being in the form of alpha monohydrate, continuously supplying such mixture to a treatment zone, causing the particles of the mix to progress through said zone in dispersed condition, continuously supplying moisture to said zone whereby the particles are caused to take up moisture while in dispersed condition and contact together to form moist random aggregates, the temperature within said zone being of the order of about 80 to 100° F. and the amount of moisture added to the particles being such that the resulting moist porous aggregates contain from 15 to 20% moisture, removing the moist porous aggregates from said zone, and then removing the major portion of such moisture from the same while leaving the aggregates substantially intact to produce a final dry product in the form of porous free flowing aggregates.

4. A process as in claim 3 in which the last named operation is carried out by subjecting material to drying air at a temperature not in excess of about 225° F.

5. As a new product of manufacture, a dry egg white product produced by the process of claim 1.

References Cited in the file of this patent
UNITED STATES PATENTS

| | | |
|---|---|---|
| 2,299,953 | Mink | Oct. 27, 1942 |
| 2,610,918 | Kline et al. | Sept. 16, 1952 |
| 2,758,933 | Shaffer | Aug. 14, 1956 |